United States Patent
Felisaz et al.

(10) Patent No.: US 6,251,464 B1
(45) Date of Patent: Jun. 26, 2001

(54) POWDERED SWEETENER COMPOSITION FOR ANIMAL FEED

(75) Inventors: Denis Felisaz, Annemasse (FR); Kim Son Doan, Thonex (CH)

(73) Assignee: Pancosma Societe Anonyme pour l'Industrie des Produits Biochimiques, Le Grand-Saconnex (CH)

(*) Notice: Subject to any disclaimer, the term of this patent is extended or adjusted under 35 U.S.C. 154(b) by 0 days.

(21) Appl. No.: 09/231,753

(22) Filed: Jan. 15, 1999

Related U.S. Application Data

(63) Continuation of application No. PCT/IB96/00740, filed on Jul. 19, 1996.

(51) Int. Cl.⁷ ........................................ A23L 1/236

(52) U.S. Cl. ................. 426/548; 426/2; 426/471

(58) Field of Search ................. 426/548, 2, 635, 426/623, 443, 471

(56) References Cited

U.S. PATENT DOCUMENTS

| | | | | |
|---|---|---|---|---|
| 3,653,923 | * | 4/1972 | Ishii et al. | 426/548 |
| 4,097,616 | | 6/1978 | Guillou et al. | 426/348 |

FOREIGN PATENT DOCUMENTS

| | | |
|---|---|---|
| 2 041 209 | 9/1980 | (GB) . |
| 2 185 674 | 7/1987 | (GB) . |
| 2 200 527 | 8/1988 | (GB) . |

* cited by examiner

*Primary Examiner*—Leslie Wong
(74) *Attorney, Agent, or Firm*—Henderson & Sturm LLP

(57) ABSTRACT

A powdered sweetener composition for animal feed containing an intimate mixture with a substantially uniform, non-statistical sweetener/potentiator distribution that is substantially constant in all particles. The particle size of the composition is particularly from 10 to 100 μm, and has a Gaussian distribution. The composition is particularly useful for preparing feed for young animals, e.g. piglets, in which case the sweetener is a saccharine salt and the potentiator is neohesperidine dihydrochalcone (NHDC), thaumatin or glycyrrhizin.

5 Claims, 2 Drawing Sheets

POWDERED SWEETENER COMPOSITION FOR ANIMAL FEED

This application is a continuation of international application number PCT/IB96/00740, filed Jul. 19, 1996.

The present invention relates to a powdered sweetener composition for animal feed and is particularly useful for preparing feed for young bred animals, e.g. piglets, calves and lambs.

BACKGROUND OF THE INVENTION

Traditionally, powdered sweeteners for animal feed are composed of a statistical mixture of two powders with very different particle sizes, i.e. a sweetening powder with a relatively coarse particle size and mixed with a potentiator in the form of a much finer powder. The sweetener, i.e. the agent bringing the sweet flavor is usually saccharine or sodium or calcium saccharinate, or sometimes other natural or artificial intense sweeteners.

The potentiator has a double role. Firstly, as its name indicates, it has the effect of extending the perception of the sweet flavor which, in its absence, would be too short. A good potentiator, as those classically used, allows an increase of the sweet perception time by approximately 50 to 80%. The other effect of the potentiator, and not the least, is to hide the secondary or parasitic tastes of the sweetener, e.g. the bitter, metallic taste of saccharine or its sodium or calcium salts.

For practical reasons of the disclosure and for a better understanding of the problem set herein, we hereinafter refer more particularly to the feeding of piglets, although the invention applies to other young reared animals such as young bovines, sheep, goats, horses, deer, etc.

For piglets, the consumption must be optimal during the weaning time, in order to ease the transition from maternal milk to solid feed. This phase brings an increased vulnerability for the piglets' health and, to prevent disease risks, the feed is sometimes supplemented with repulsive-tasting medicinal products. This is intended to stimulate its appetite so that it eats the maximum feed, by serving rations containing sweeteners, the young animal being especially fond of the sweet flavor it was used to with its mother's milk. For instance, a weaned 28 day old piglet weighing 6.5 to 8 kg, eats 200 to 300 g per day of food, usually in granulated form. A piglet absorbs with each mouthful approximately 8 g, that is some fifty granules, which is very little. But, as from the age of 8 days, the piglet is already given granulated feed under the mother for it to get used to its future diet. It only eats 30 to 40 g per day, which represents only some ten granules per mouthful. With or without medical supplementation, its appetite is stimulated by proposing tasty food and this is why it has become usual to give granules with incorporated sweeteners. These granules, weighing about 0.15 g with a mean diameter of 0.3 cm and a length of 1.5 cm, are composed of a sweetener in an amount of approximately ¼ by weight dispersed on a support, of approximately ¾ by weight, which can be dextrose silica, ground cereals or combinations thereof. The proportion of saccharine to the potentiator is in the order of 100 to 1–2 and approximately 400 g/t (gram per metric ton) of this mixture is added to the final food.

In order to avoid any ambiguity, in the terminology used hereinafter the word "sweetener" shall be used to designate the sweetener/potentiator mix, object of the invention, as well as traditional corresponding products which will serve as comparison, whereas the expression "sweetening formulation" or "sweetening premix" shall be used when the sweetener proper is dispersed in a support. This sweetening formulation, which in a way is a seasoning like salt or pepper for human foods, will then be incorporated into the final feed given to the piglet.

Traditional sweeteners are statistical mixtures of one or more sweeteners and of one or more potentiators which have, as stated before, very different particle sizes. In spite of the care which can be brought to their realization, this can only result in mixtures with a great heterogeneity. They will therefore be named hereafter "coarse sweeteners".

This great inhomogeneity, conjugated with the absorption by the piglet of a very reduced number of granules per mouthful, leads to the effect felt by the young animal possibly being very different from one mouthful to another (and leading to variations of consumption): one mouthful can have a hardly-perceptible sweet taste, whereas the following mouthful can be too sweet or event bitter and metallic because of difficulties to hide the aftertaste of the saccharine, in spite of the potentiator, when it is too concentrated. Traditional sweetening formulations, based on coarse sweeteners, although widely used in rearing for lack of better, only give moderate satisfaction.

Generally, questions linked to the use of sweeteners in animal feed are curiously infrequent in the literature and we will quote for example the disclosure of DE-2 029 749 which has no relation to the object of the present invention, because it concerns a nutrient formed of a layer of sweetening substance and containing assimilable iron.

SUMMARY OF THE INVENTION

The problems evoked hereinabove are solved by the invention, in a surprisingly simple way, the invention consisting in proposing a powdered sweetener for animal feed in the form of an intimate mixture with a substantially uniform, non-statistical sweetener/potentiator distribution, and wherein the proportion of sweetener to potentiator is substantially constant in all particles.

Preferably, the powdered sweetener according to the invention has a particle size comprised between 10 and 100 $\mu$m, with a Gaussian distribution. Preferably too, the proportion sweetener/potentiator(s) is comprised between 100/0.2 and 100/2, expressed in parts by weight.

As indicated above and as will be seen below, because the proportion of potentiator to sweetener is substantially constant and equal from one particle to the other, it will be constant from one granule to the other in the sweetening formulation wherein the sweetener is dispersed in a support, and finally in the food given to the animal.

It shall be easily be understood, in these conditions, that the appetite of the piglet will be all the more stimulated as it will be given the constant sweet taste it wants, with a constant intensity and profile, without variation from one mouthful to another.

The purpose is of course to enhance the economic efficiency of the young reared animal, allowing a faster and more regular weight increase, comparable for all animals.

The young animal, placed in front of the sweetener according to the invention, will eat with a better appetite, and thus more or less efficiently, and will thus gain more weight than a young animal placed in front of a formulation comprising a coarse sweetener with an identical composition. It will result in less wastage, and as will be seen hereunder, it will allow use of less sweetener in the granules, the sweetening powder being generally in the form of a finer powder than the traditional coarse sweetener.

Indeed this is one of the preferred embodiments according to the invention, the sweetener according to the invention can be presented as a powder with a Gaussian distribution and a mean particle diameter comprised between 10 and 100 µm, comprising between 65,000,000 and 85,000,000, for example around 75,000,000 particles per gram, compared to saccharine of 40–80 mesh having a particle size comprised between 100 and 1000 µm and comprising only 50,000 to 70,000, with a mean of 60,000 particles per gram.

An economy shall thus be made both through a better regularity of the feed of the young animal and due to the fact that according to the invention the wanted sweet taste can be brought to the granules and to the final feed using less sweetener.

Sodium or calcium saccharinate and saccharine already quoted can be used as sweeteners, as well as other sweeteners like aspartylphenylalanine, acesulfam and cyclamates and stevioside which is a glycoside of natural origin.

As potentiators, the piglet feed can use thaumatin, which is a protein of vegetable origin, and glycosides such as neohesperidine dihydrochalcone (NHDC), glycyrrhizin, etc., alone or mixtures thereof. These substances insure a great lingering of the sweet taste and cover the bitter and metallic aftertaste of saccharine and their salts.

The powdered sweetener according to the invention can also contain other ingredients in small quantities, such as flavor enhancers, sodium glutamate, nucleotides (sodium inosinate and guanylate), maltol and ethylmaltol, etc., and flavors. These ingredients are included in "microingredients" which can enter the intermediate formulation of the feed or premix which can also contain vitamins, oligo-elements, even medicinal substances administered preventively of prophylactically. Those substances are generally calculated to be present in an amount of 5 to 10 kg per ton in the final feed.

The powdered sweetener according to the invention can be prepared very easily, according to a technology well known in human feeding and in the technology of flavor manufacturing, as "micronisation", i.e. atomizing and drying a liquid mixture, pulverized in an appropriate apparatus. This apparatus can take the form of a tower, in which the liquid mixture is fed from the top in a nozzle or a turbine, the atomized powder being collected at the base of the tower. In some cases, if necessary, the tower can be filled with an inert gas to prevent oxidation phenomena.

The powdered sweetener according to the invention can be used in two ways in the feeding of young reared animals. First, in a classical way, the sweetener according to the invention can be dispersed on a support of the type of dextrose, silica or ground cereals for example in an amount of 10 to 75 weight parts of sweetener for 90 to 25 parts by weight of support. On the basis of usual values, this allows to constitute a final feed with a mean dose of 200 to 600 g/t, preferably 400 g/t, which corresponds to a quantity of sweetener of the order of 100 to 150 g/t and 1.2 to 1.8 g/t of potentiator on the basis of the mean dose of 400 g/t. It should be understood that, as the sweetener according to the invention is perfectly homogeneous and the particle size of this sweetener is sufficiently fine, there will be no difficulty to obtain a sweetening formulation on the support, then a final feed, both perfectly homogenous too.

Another possible use of the sweetener according to the invention is to dissolve it in feed water for the young animal, particularly in an amount of 2 to 3 g/l, this sweetener powder being water-soluble without any difficulty.

DESCRIPTION OF THE PREFERRED EMBODIMENTS

Figure 1:
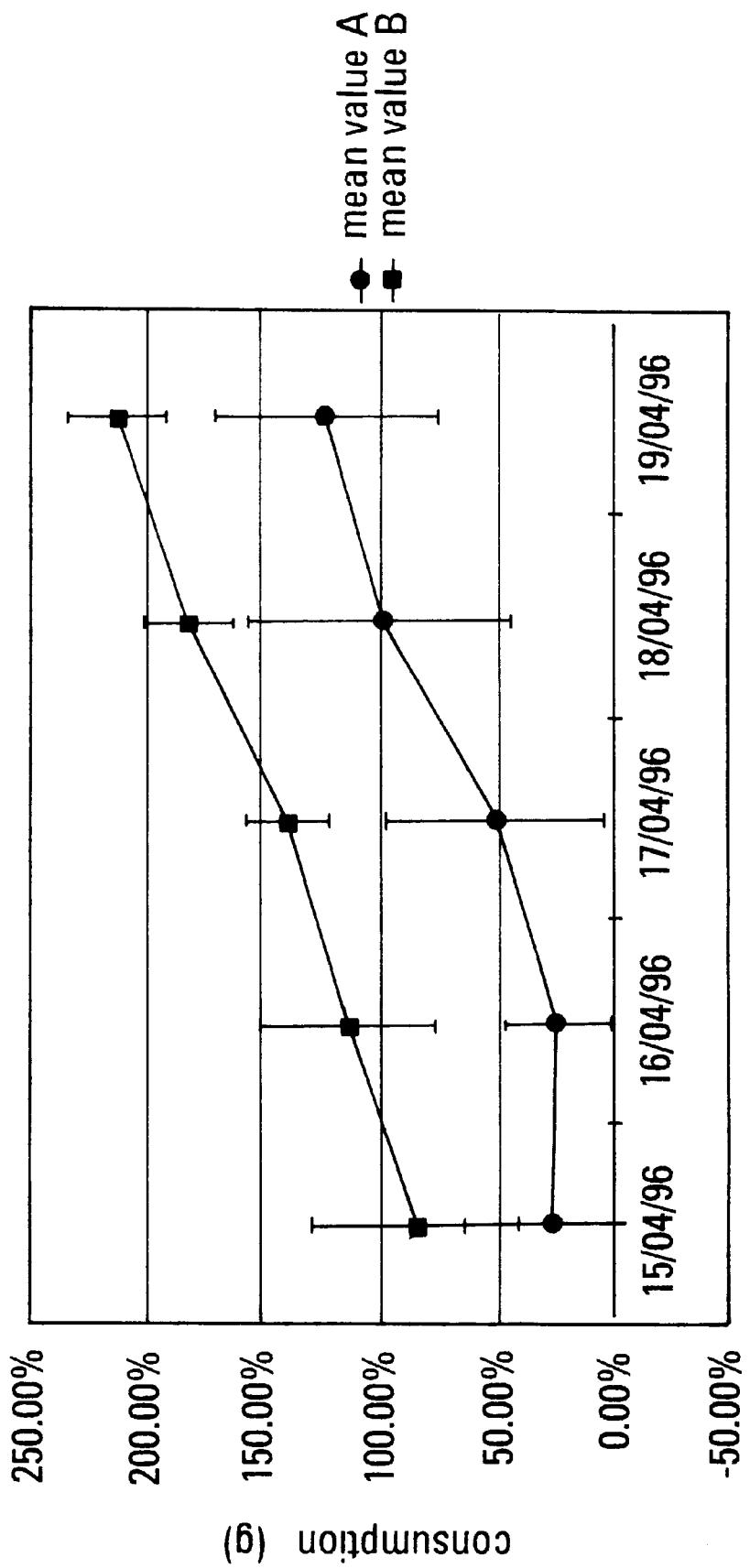
FIG. 1 represents the evolution of the mean consumption of the piglets in g/day over 4 days.

The invention shall be better understood by reference to the following non-limiting examples. These examples will be followed by comparative examples in order to highlight the advantages of the invention which are:

a regular sweetening power, the possibility to add adjuvant in regular quantities an excellent conservation stability, better than that of the coarse sweetener whose two constitutive powders, with very different particle sizes, tend with time to segregate or to sediment.

EXAMPLES 1 to 10

A solution A is prepared from one or more sweetener(s) by introducing 900 liters of water in a vat, then heating to 60° C. 1000 kg of sweetener(s) are then slowly added, the solution being agitated during 30 minutes until complete dissolution (the solution becomes transparent).

Meanwhile, in a small vat filled with 100 liters of water heated at 70° C., the potentiator(s) is (are) slowly added, in a quantity corresponding to the desired sweetener/potentiator proportion for the sweetener to be prepared, then the product is allowed to dissolve for 30 minutes.

The potentiator(s) solution is slowly added to the sweetening solution.

When the solution becomes transparent, a spray-drying operation is performed in a column under the following working conditions:

| | |
|---|---|
| Solution temperature: | 60° C. |
| Incoming air temperature: | 190° C. |
| Outgoing air temperature: | 100° C. |
| Atomization turbine rotation speed: | 15,000 rpm to 20,000 rpm. |

A sweetener according to the invention is thus obtained, presented under the form of a fine homogenous powder having a particle size with a Gaussian distribution comprised between 10 and 100 µm with a mean of 48.5 µm and comprising around 75,000,000 particles or grains per gram. This powder is water-soluble.

Powdered sweeteners have thus been produced, with sweeteners and potentiators according to the proportions expressed in weight parts, as follows:

| Examples | Sweeteners | Potentiators | Proportions |
|---|---|---|---|
| 1 | Sodium saccharinate | Thaumatin | 25/0.05 |
| 2 | Calcium saccharinate | NHDC | 25/0.3 |
| 3 | Sodium saccharinate | Glycyrrhizin | 25/0.1 |
| 4 | Acesulfam | NHDC | 25/0.33 |
| 5 | Sodium saccharinate/ Acesulfam | NHDC | 16/8/0.33 |
| 6 | Sodium saccharinate | Glycyrrhizin NHDC | 25/0.1/0.1 |
| 7 | Sodium saccharinate | Glycyrrhizin Stevioside | 25/0.1/2 |
| 8 | Sodium saccharinate | NHDC Thaumatin | 25/0.2/0.02 |

-continued

| Examples | Sweeteners | Potentiators | Proportions |
|---|---|---|---|
| 9 | Sodium saccharinate | NHDC/Maltol | 25/0.33/0.2 |
| 10 | Sodium saccharinate | NHDC/ethylmaltol | 25/0.33/0.1 |

The thaumatin used in Example 1 and 8 was from the Hays ingredients company and is distributed under the trademark Talin.

COMPARATIVE EXAMPLES 1 to 4

1

A sample of 40/80 mesh coarse sweetener (reference) is measured and is compared to a sweetener according to the invention, obtained with the "micronisation" process described hereinabove.

With substantially the same densities, i.e. 1.5692 g/cm$^3$ for the reference sample and 1.5270 g/cm$^3$ for the invention sample according to Example 1, we observe that the latter contains 75,563,288 particles per gram against 58.760 particles per gram for the reference.

2

A 40/80 mesh coarse sweetener of the hereinabove comparative example is compared to the micronised sweetener of Example 1 by first preparing otherwise identical granulated feed with both sweeteners. Then the same number of granules is taken at random from each batch, which are then analyzed individually with high performance liquid phase chromatography, to seek the sodium saccharinate peak, after extraction by centrifugation in water with a dilution of 0.1 g per 500 µl.

The results, reported in the Table below, relate to the areas of the saccharinate peeks, and represent their concentrations. They clearly show the great disparity of the presence of saccharinate in the reference sample, some samples even comprising no saccharinate at all.

They also show the great homogeneity of the saccharinate distribution in the sweetener of Example 1.

| Sample wlth Saccharine according to the invention | | Sample with 40-80 Mesh Saccharine | |
|---|---|---|---|
| View # | Area | View # | Area |
| 1 | 7870 | 1 | 12547 |
| 2 | 6525 | 2 | 33570 |
| 3 | 7355 | 3 | 7215 |
| 4 | 7082 | 4 | 43265 |
| 5 | 7071 | 5 | 4694 |
| 6 | 6286 | 6 | 32594 |
| 7 | 7174 | 7 | 3146 |
| 8 | 8695 | 8 | 34395 |
| 9 | 6783 | 9 | 7254 |
| 10 | 7792 | 10 | 44125 |
| 11 | 7109 | 11 | 4761 |
| 12 | 7387 | 12 | 33147 |
| 78% homogeneity in the ditribution of saccharine | | 33% of views contained no saccharine | |
| | | 22% ot views had a mean area of 33000 | |
| | | 11% of views had a mean area of 43000 | |
| | | 11% of views had a mean area of 12000 | |
| | | 11% of views had a mean area of 7000 | |
| | | 11% of views had a mean area of 5000 | |

Conclusion: The considerable variation in the areas show without ambiguity that the distribution of saccharine is not homogenous.

3

The reference coarse sweetener is compared to the sweetener according to the invention from Example 1 with the help of two batches of piglets under their mother during the weaning process, during 5 days from the 19th to the 23rd day. The reference piglets are given a feed available under the trademark Palatone, distributed by the Pancosma company. The other piglets are given identical Palatone feed, but containing the sweetener according to the invention instead of the usual coarse sweetener. FIG. 1 hereinafter attached represents the evolution of the mean consumption of the piglets in g/day over 4 days. The lower curve represents the coarse reference and the upper curve relates to the sweetener according to the invention.

It is immediately observed that the piglets who are given the feed containing the sweetener according to the invention absorb more food than the piglets who were given the feed containing the coarse sweetener, so take more weight.

4

Figure 2:
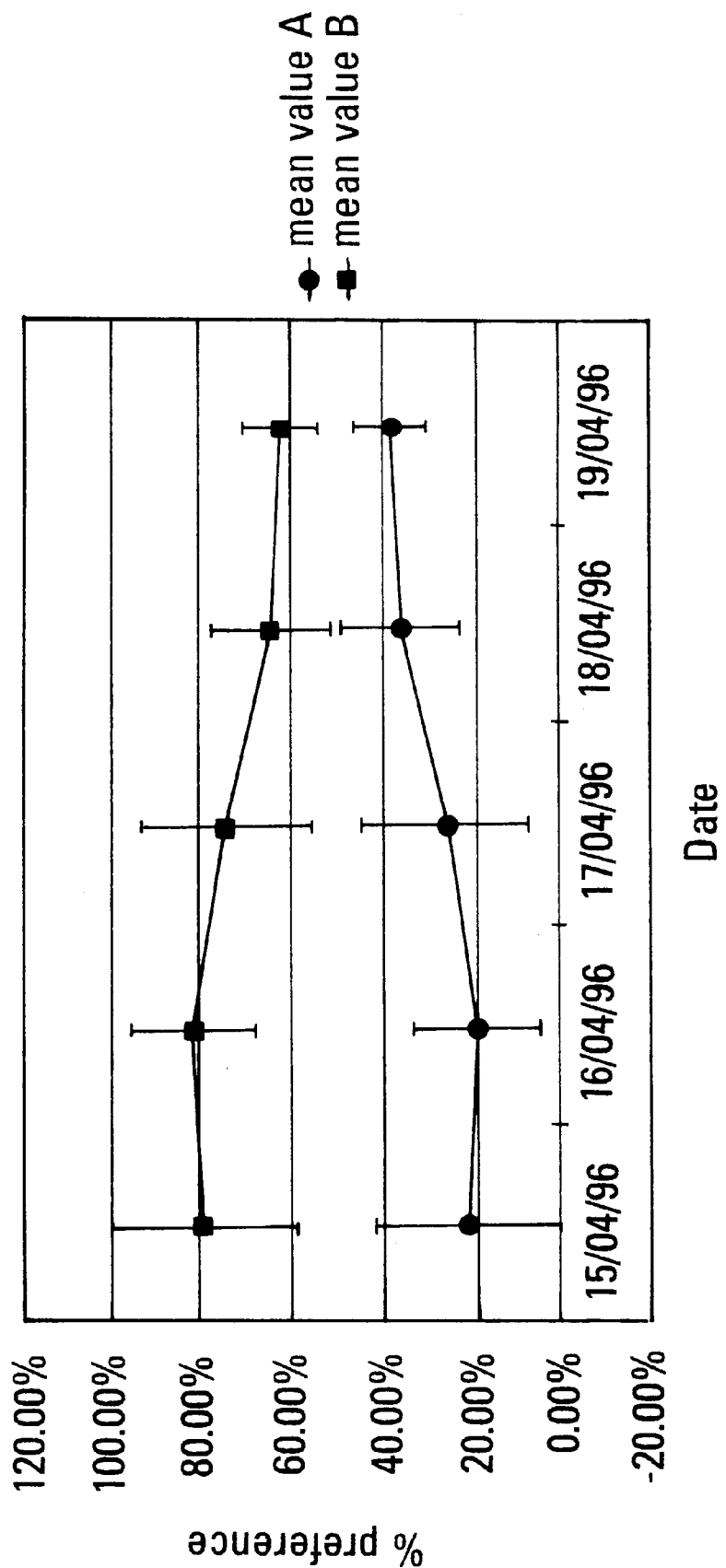
FIG. 2 represents the evolution of the preferences of the piglets during the 4 days.

Using the commercial Palatone from the preceding comparative example (coarse sweetener) and the reconstituted Palatone with the sweetener according to the invention, the latter is compared to the coarse sweetener according to a free choice test on piglets under their mother during the weaning process, on 4 days between the 19th and the 22nd day. FIG. 2 hereinafter attached represents the evolution of the preferences of the piglets during the 4 days. The lower curve represents the coarse reference and the upper curve relates to the sweetener according to the invention.

It is immediately observed that there is a 80% preference of the piglets for the feed containing the sweetener according to the invention, the preference wanes throughout the days, but stays marked and stabilizes to 60% against 40% only for the coarse sweetener feed.

What is claimed is:
1. Process for preparing a powdered sweetening composition for animal feed, comprising the steps, preparing a mixture in solution of a sweetener and a potentiator, then obtaining a powder by pulverizing this mixture by spray drying, wherein said animal sweetening composition comprises an intimate mixture with a substantially homogeneous, non statistical sweetener/potentiator distribution, wherein the proportion of sweetener to potentiator is substantially constant from one particle of said powdered sweetening composition to another, and wherein said sweetening composition has a particle size comprised between 10 µm and 100 µm, with a Gaussian distribution.

2. Process for preparing the sweetening composition according to claim 1, wherein the proportion of sweetener/potentiator is comprised in the range of 100/0.2, and 100/2, expressed in parts by weight.

3. Process for preparing the sweetening composition according to claim 1, wherein the sweetener is selected from the group consisting of sodium of calcium saccharinates, saccharine, aspartyl-phenylalanine, acesulfar, cyclamates and stevoiside, and mixtures thereof.

4. Process for preparing the sweetening composition according to claim 1, wherein the potentiator is selected from the group consisting of thaumatin, neohesperidine dihydrochalcone (NHDC), glycyrrhizin and mixtures thereof.

5. Process for preparing the sweetening composition according to claim 1, wherein said sweetening composition further comprises additional ingredients selected from the group consisting of flavor enhancers and flavorings.

* * * * *